United States Patent [19]

Wessel et al.

[11] 4,337,613
[45] Jul. 6, 1982

[54] WHEEL ASSEMBLY FOR HAYING MACHINE

[75] Inventors: Ulrich Wessel; Albert Krauss, both of Gottmadingen, Fed. Rep. of Germany

[73] Assignee: Klöckner-Humboldt-Deutz AG Zweigniederlassung Fahr, Gottmadingen, Fed. Rep. of Germany

[21] Appl. No.: 206,619

[22] Filed: Nov. 13, 1980

[30] Foreign Application Priority Data

Nov. 16, 1979 [DE] Fed. Rep. of Germany ....... 2946404

[51] Int. Cl.³ .............................................. A01D 79/00
[52] U.S. Cl. ................................................... 56/370
[58] Field of Search ................ 56/370, 13.6, 371, 372, 56/373, 374

[56] References Cited

U.S. PATENT DOCUMENTS

| 101,428 | 4/1870 | Card | 248/188.4 |
| 2,194,617 | 3/1940 | Scott | 56/13.6 |
| 3,474,610 | 10/1969 | Kreienbaum et al. | 56/372 |
| 4,175,369 | 11/1979 | Gerlinger | 56/370 |

FOREIGN PATENT DOCUMENTS 2156229  5/1973  Fed. Rep. of Germany ........ 56/370

Primary Examiner—Robert A. Hafer
Attorney, Agent, or Firm—Karl F. Ross

[57] ABSTRACT

A haying machine has a frame on which is fixed an upright threaded spindle defining an upright axis. A nut is threaded on this spindle so that rotation of the nut on the spindle displaces it axially along the spindle. A rigid wheel support has one end fixed to the nut and another end defining a horizontal axis about which a wheel rotates. A spring assembly normally urges the wheel with the associated support nut into a predetermined angular position corresponding to straight-ahead travel of the haying machine on the spindle. In order to adjust the height of the wheel it is merely rotated in the appropriate direction about the spindle with its associated nut and support.

6 Claims, 2 Drawing Figures

WHEEL ASSEMBLY FOR HAYING MACHINE

FIELD OF THE INVENTION

The present invention relates to a wheel assembly for a haying machine. More particularly this invention concerns a caster-type wheel assembly which permits vertical adjustment of the wheel relative to the structure on which it is mounted.

BACKGROUND OF THE INVENTION

A haying machine normally has a frame carried on the three-point hitch of a tractor. During use of the haying machine the frame is lowered down so that the machine can ride via a plurality of castering wheels on the ground. Each of these wheels is associated with a respective set of spring tines that serves to turn or ted hay lying on the ground underneath the machine, as described in German patent document No. 2,156,229 of G. Knusting.

It is normally considered necessary to be able to vary the vertical height of the spring tines carried by the wheel relative to the ground. This is most easily done by providing some adjustment means for displacing the wheel relative to the mechanism carrying the spring tines. Austrian Pat. No. 198,559 and U.S. Pat. No. 2,194,617 describe a system wherein the wheel is carried on a spindle slidable in a support and formed with a row of laterally open holes. A pin can engage from the support into the holes to allow the spindle carrying the wheel to be set at heights corresponding to the levels of the holes.

This system, which is typical of the adjustment systems used in the wheel assemblies of haying machines, provides only a relatively coarse adjustment of the wheel height. Furthermore the system has the disadvantage that the wheels frequently position themselves backward or perpendicular to the travel direction, so that when the haying machine is lowered down into contact with the ground quite some force must be exerted on them to spin them around, this force at least temporarily distorting the frame of the haying machine.

OBJECTS OF THE INVENTION

It is therefore an object of the present invention to provide an improved wheel assembly for a haying machine.

Another object is to provide such a wheel assembly which permits relatively fine adjustment of the wheel height.

SUMMARY OF THE INVENTION

These objects are attained according to the instant invention in a haying machine whose frame is provided with a fixed upright threaded spindle that defines an upright axis. A nut is threaded on this spindle so that rotation of the nut on the spindle about the upright axis displaces the nut axially along the spindle in a direction depending on the rotation direction. A rigid wheel support has one end fixed to the nut and another end defining a horizontal axis. A wheel is carried on this other end and is rotatable about the horizontal axis.

Thus with the system according to the instant invention it is possible to adjust the wheel height simply by rotating the wheel with its support and nut on the spindle, screwing it up or down relative to the frame. The device has the considerable advantage that it eliminates the normally necessary bearing structure that permits castering of the wheel, since the nut can turn freely on the spindle. The pitch of the screw thread of the spindle is chosen to be so very small that minor twisting of the wheel as it casters along behind the tractor pulling the hay machine will not appreciably change the height adjustment.

According to further features of this invention spring means is connected between the spindle and the support for urging the support into a predetermined angular position relative to the upright axis and corresponding to straight-ahead travel of the haying machine. This spring structure works particularly effectively in combination with the threaded spindle and nut according to the instant invention. The spring means prevents vibration or the like from rotating the nut and the wheels about the spindle when the wheels are out of contact with the ground, as when the haying machine is being transported to or from the field. At the same time these springs insure that the wheels are normally aligned with the travel direction for the vehicle, so that when the haying machine is lowered down by the three-point hitch into contact with the ground the wheels are already properly aligned.

The spring means according to this invention includes an anchor mounted on the lower end of the spindle offset from the upright axis, another anchor mounted on the support, and a tension spring and rigid link hooked between these anchors. The wheel lies in a plane perpendicular to the horizontal axis and generally including the upright axis, and the anchors are to one side of this plane in the predetermined straight-ahead position of the support. In this straight-ahead position the spring is of minimal length, increasing in length with pivoting to of the wheel to either side of this position. Nonetheless the entire wheel assembly can be forceably rotated about the spindle without damage to the spring or link, and will naturally return to the straight-ahead position at any level.

In accordance with yet another feature of this invention the support is a rigid U-shaped arm having a pair of legs constituting the ends and an intermediate portion extending at an angle to both of the axes. Thus it is possible to use a wheel which has a greater radius than the vertical distance between the horizontal axis and the lower end of the spindle. The assembly therefore can be made very compactly and with only a minimum number of parts. In fact, in the assembly according to this invention only the interconnecting structure of the wheel, support, and nut can move relatively to the spindle, and the spring structure can pivot about the lower end of the spindle. Such extremely simple structure can be produced at very low cost, yet will have all of the advantages of substantially more complex structure.

SPECIFIC DESCRIPTION

Figure 1:
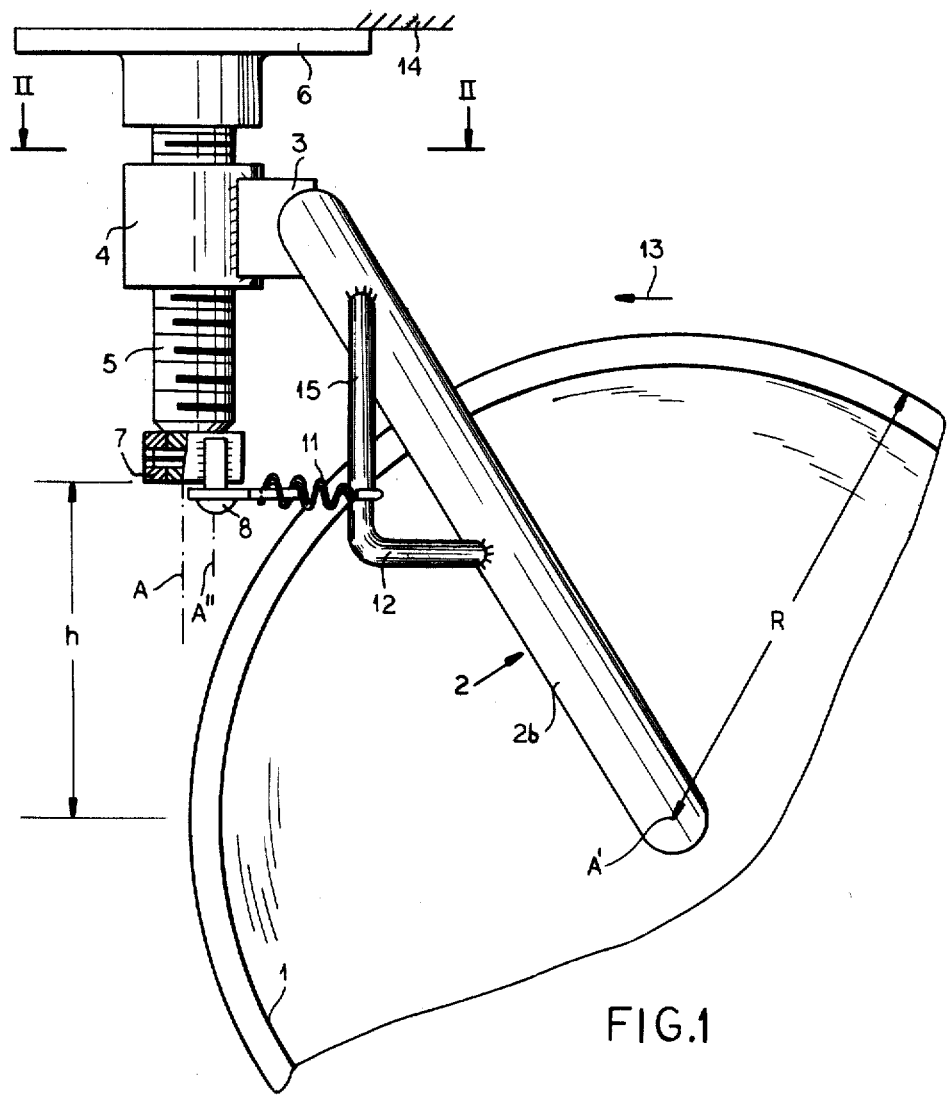
FIG. 1 is a side view of the wheel assembly according to the instant invention.

As seen in FIG. 1 a hay-making machine has a frame 14 to which is secured a base plate or socket 6 in which is welded an upright threaded spindle 5 defining a vertical axis A. A nut 4 is threaded on this spindle over several turns thereof and is welded to a block 3 to which in turn is welded one end 2a of a U-shaped support arm 2 having an intermediate or bight portion 2b and another end 2c defining a horizontal axis A'. A wheel 1 is mounted on this end 2c for rotation about the axis A' and has a radius R.

Fixed on the lower end of the spindle 5 is a cylindrical body 7 to whose outer edge is welded a bolt 8 on which a flat metal link 9 can pivot freely about an axis A" parallel to but offset from the axis A. Hooked between a hole 10 in the outer end of this link 9 and U-shaped anchor strut 12 carried on an intermediate portion 2b of the support 2 is a tension spring 11.

Figure 2:
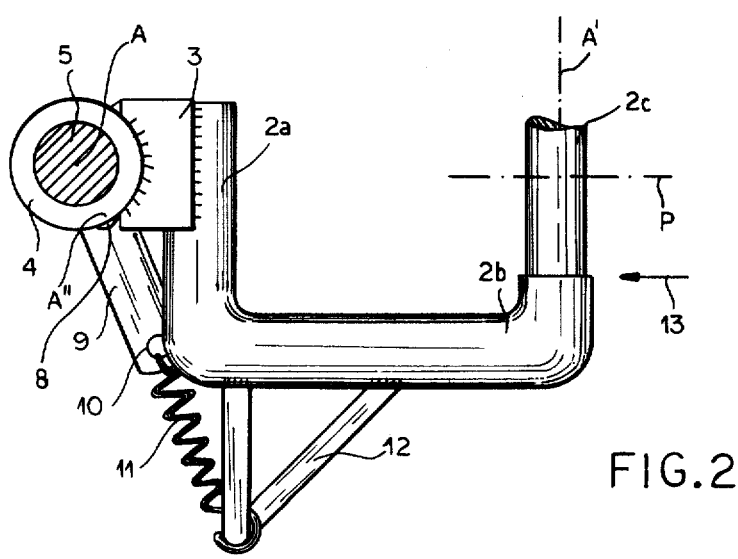
FIG. 2 is a section taken along the line II—II of FIG. 1.

Arrow 13 in FIG. 2 represents the normal straight-ahead direction of travel of the haying machine having the frame 14. When the plane P of the wheel 1 is parallel to this direction the spring 11 forms a straight line extending from the anchor 12 through the axes A" and A. Thus in this position the spring 11 will be under minimal tension so that when the wheel 1 is in any other position this spring 11 will seek to return it to its center position.

In order to adjust the height of the wheel 1 relative to the frame 14 the operator need merely lift the wheel 1 off the ground, normally by simply raising the entire haying machine 14 by means of the three-point hitch, and then screw the entire wheel, support, and nut assembly around this spindle 5 in the direction moving it up or down depending on what is needed. The strut 12 has an arm 15 on which the spring 11 is hooked, and this arm 15 extends parallel to the axes A and A" so that when screwed up or down the spring 11 will be able to slide along the arm 15. Rotation of the wheel 1 with its associated structure about the spindle 5 will merely stretch the spring 11, but well below its elastic limit so that the assembly will naturally return to its dead-center or straight-ahead position no matter what level it is left at.

The intermediate portion 2b of the support 2 lies at an angle to the axis A so that the vertical height h between the axis A' and the lower end of the spindle 5 can be substantially smaller than the radius R of the wheel 1. In addition such horizontal offset insures good castering of the wheel 1.

We claim:

1. In a haying machine having a frame, a wheel assembly comprising:
    an upright threaded spindle fixed to said frame, having a lower end, and defining an upright axis;
    an anchor fixed to said lower end of said spindle and forming a pivot offset from said upright axis;
    a nut threaded on said spindle above said anchor, whereby rotation of said nut on said spindle about said upright axis displaces said nut axially along said spindle;
    a rigid wheel support having one end fixed to said nut and another end defining a horizontal axis, said support having another anchor horizontally generally level with said anchor of said spindle, said other anchor and pivot being most closely juxtaposed when said support lies in a predetermined angular position relative to said upright axis corresponding to straight-ahead travel of said haying machine;
    a generally horizontal spring element below said lower end of said spindle and engaged between said pivot and said other anchor of said wheel support, whereby said spring element orbits about said pivot underneath said spindle as said wheel support, other anchor, and nut rotate about said upright axis; and
    a wheel carried on said other end and rotatable about said horizontal axis.

2. The assembly defined in claim 1 wherein said wheel lies in a plane perpendicular to said horizontal axis and generally including said upright axis, said anchors being to one side of said plane in said predetermined angular position of said support.

3. The assembly defined in claim 1 wherein said support has an intermediate portion between said ends extending at an angle to both of said axes, said wheel having a greater radius than the vertical distance between said horizontal axis and the lower end of said spindle.

4. The assembly defined in claim 1 wherein said spring element includes:
    a tension spring having one end hooked to one of said anchors and another end; and
    a rigid link connected to the other of said anchors a said other end of said tension spring.

5. The assembly defined in claim 4 wherein said tension spring is hooked to said other anchor of said support and said rigid link is pivoted on said anchor of said spindle at said pivot.

6. The assembly defined in claim 1 wherein said other anchor of said support is formed as a straight arm extending generally parallel to said upright axis, said spring element being vertically slidable along said arm.

* * * * *